United States Patent
Shimizu et al.

(10) Patent No.: US 9,478,909 B2
(45) Date of Patent: Oct. 25, 2016

(54) VEHICLE-SIDE CONNECTOR

(71) Applicant: Sumitomo Wiring Systems, Ltd., Yokkaichi, Mie (JP)

(72) Inventors: Tooru Shimizu, Mie (JP); Toshiyuki Matsuda, Mie (JP)

(73) Assignee: Sumitomo Wiring Systems, Ltd. (JP)

(*) Notice: Subject to any disclaimer, the term of this patent is extended or adjusted under 35 U.S.C. 154(b) by 0 days.

(21) Appl. No.: 14/772,129

(22) PCT Filed: Mar. 19, 2013

(86) PCT No.: PCT/JP2013/057893
§ 371 (c)(1),
(2) Date: Sep. 2, 2015

(87) PCT Pub. No.: WO2014/147764
PCT Pub. Date: Sep. 25, 2014

(65) Prior Publication Data
US 2016/0013587 A1    Jan. 14, 2016

(51) Int. Cl.
*H01R 13/633* (2006.01)
*H01R 13/639* (2006.01)
*B60L 11/18* (2006.01)
(Continued)

(52) U.S. Cl.
CPC ......... *H01R 13/633* (2013.01); *B60L 11/1816* (2013.01); *B60L 11/1818* (2013.01); *H01R 13/5227* (2013.01); *H01R 13/6395* (2013.01); *H01R 13/5202* (2013.01);
(Continued)

(58) Field of Classification Search
CPC .......... H01R 13/6275; H01R 2101/26; H01R 13/6397; H01R 13/62933; H01R 13/629
See application file for complete search history.

(56) References Cited

U.S. PATENT DOCUMENTS 8,529,273 B2 * 9/2013 Maegawa ........... B60L 11/1818
439/206
8,651,875 B2 * 2/2014 Ferguson ........... H01R 13/6397
439/34

(Continued)

FOREIGN PATENT DOCUMENTS

EP    2525443 A1    11/2012
JP    H07192806 A    7/1995

(Continued)

OTHER PUBLICATIONS

International Search Report.

(Continued)

*Primary Examiner* — Gary Paumen
(74) *Attorney, Agent, or Firm* — Gerald E. Hespos; Michael J. Porco; Matthew T. Hespos

(57) ABSTRACT

A vehicle-side connector (10) is connected to a battery mounted in a vehicle and is configured so that a charging connector (50) connected to a charger is connectable thereto from the front. The vehicle-side connector (10) includes a forwardly open lock fitting (22) configured so that a tip part of a lock arm (54) in the charging connector (50) is fit therein from the front. A locked portion (25) in the lock fitting (22) is formed by mounting a metal lock plate (25B) on a base (25A). The lock plate (25B) is made of metal and is configured so that the tip part of the lock arm (54) is to be locked thereto. A mounting hole (25C) for mounting the lock plate (25B) from behind is formed on a back wall (22B) of the lock fitting (22) and a cover (15) is provided to close the mounting hole (25C).

8 Claims, 14 Drawing Sheets

(51) Int. Cl.
*H01R 13/52* (2006.01)
*H01R 13/627* (2006.01)

(52) U.S. Cl.
CPC ....... *H01R 13/6275* (2013.01); *Y02T 10/7005* (2013.01); *Y02T 10/7072* (2013.01); *Y02T 90/14* (2013.01)

(56) References Cited

U.S. PATENT DOCUMENTS

2011/0034053 A1* 2/2011 Matsumoto ........... B60L 3/0069
439/304
2011/0281452 A1 11/2011 Kurumizawa
2012/0295460 A1 11/2012 Ichio

FOREIGN PATENT DOCUMENTS

JP 2011-239620 11/2011
JP 2012-221612 11/2012

OTHER PUBLICATIONS

European Search Report Dated January 20, 2016.

\* cited by examiner

VEHICLE-SIDE CONNECTOR

BACKGROUND

1. Field of the Invention

The present invention relates to a vehicle-side connector.

2. Description of the Related Art

A vehicle-side connector to be connected to a battery mounted in a vehicle is known, for example, from Japanese Unexamined Patent Publication No. 2012-221612. This vehicle-side connector includes a hollow cylindrical receptacle into which a charging connector connected to a power supply is connectable. The charging connector is provided with a lock arm and a locking portion is provided on a tip part of this lock arm. A locked portion for holding the two connectors in a connected state by being locked to the locking portion of the lock arm is provided on the upper surface of the receptacle. This locked portion is composed of a lock plate made of metal and a base portion formed on the upper surface of the receptacle, and the lock plate is mounted onto this base portion from above.

High-pressure water is used at the time of car washing and it is considered to form a water cut-off wall for covering the locked portion on the upper surface of the receptacle to avoid direct hit of this high-pressure water on locked portion. However, if the water cut-off wall is formed, the lock plate cannot be mounted on the base portion from above by being obstructed by the water cut-off wall.

The present invention was completed based on the above situation and aims to enable the mounting of a lock plate while avoiding direct hit of high-pressure water on a locked portion.

SUMMARY

The present invention is directed to a vehicle-side connector configured such that a charging connector connected to a charger is connectable thereto from front and to be connected to a battery mounted in a vehicle, including a lock fitting portion open forward and configured such that a tip part of a lock arm provided in the charging connector is fitted thereinto from front, and a locked portion provided in the lock fitting portion and formed by mounting a lock plate made of metal and configured such that the tip part of the lock arm is to be locked thereto on a base portion, wherein a mounting hole for mounting the lock plate from behind is formed on a back wall of the lock fitting portion and a cover is provided to close the mounting hole.

According to such a configuration, the locked portion is covered by the lock fitting portion and direct hit of high-pressure water on the locked portion can be avoided by providing the lock fitting portion. Further, since the lock plate is mounted through the mounting hole from behind, it is not necessary to mount the lock plate from above and the lock fitting portion does not stand as a hindrance in mounting the lock plate. Further, since the cover for closing the mounting hole is provided, water intrusion into the interior of the vehicle through the mounting hole can be avoided. Further, in molding the base portion on which the lock plate is to be mounted, a forming mold is inserted through the mounting hole and removed in the front-back direction, whereby the base portion can be molded.

The following configurations are preferable as embodiments of the present invention.

A lock release preventing device configured to prevent the tip part of the lock arm from pivoting in a direction to be unlocked from the lock plate in a state where the tip part of the lock arm is locked to the lock plate may be provided.

According to such a configuration, the tip part of the lock arm and the lock plate can be doubly locked by the lock release preventing device.

The lock release preventing device may include a shaft portion configured to move between a locking position for preventing the lock arm from pivoting by being locked to the tip part of the lock plate and a releasing position for allowing the lock arm to pivot by being separated from the tip part of the lock arm, an insertion portion allowing the shaft portion to be inserted therethrough, and a water cut-off portion provided on a front end part of the shaft portion and having an outer diameter larger than an inner diameter of the insertion portion.

Generally, a clearance for allowing a smooth movement of the shaft portion is formed between the outer peripheral surface of the shaft portion and the inner peripheral surface of the insertion portion. According to the above configuration, since the above clearance can be covered from front by the water cut-off portion, water intrusion into the above clearance can be prevented at the time of car washing.

The water cut-off portion may close a clearance formed between an inner peripheral surface of the insertion portion and an outer peripheral surface of the shaft portion at the releasing position from front.

According to such a configuration, water intrusion can be more reliably prevented since the above clearance is closed by the water cut-off portion.

The lock release preventing device may be an actuator configured to drive the shaft portion in a front-back direction.

According to such a configuration, the shaft portion can be driven by the actuator.

A seal ring to be sandwiched between an opening edge part of the mounting hole and a case of the lock release preventing device may be provided.

According to such a configuration, water intrusion into the interior of the vehicle through the mounting hole can be prevented by the seal ring.

According to the present invention, it is possible to enable the mounting of a lock plate while avoiding direct hit of high-pressure water on a locked portion.

DETAILED DESCRIPTION

Figure 1:
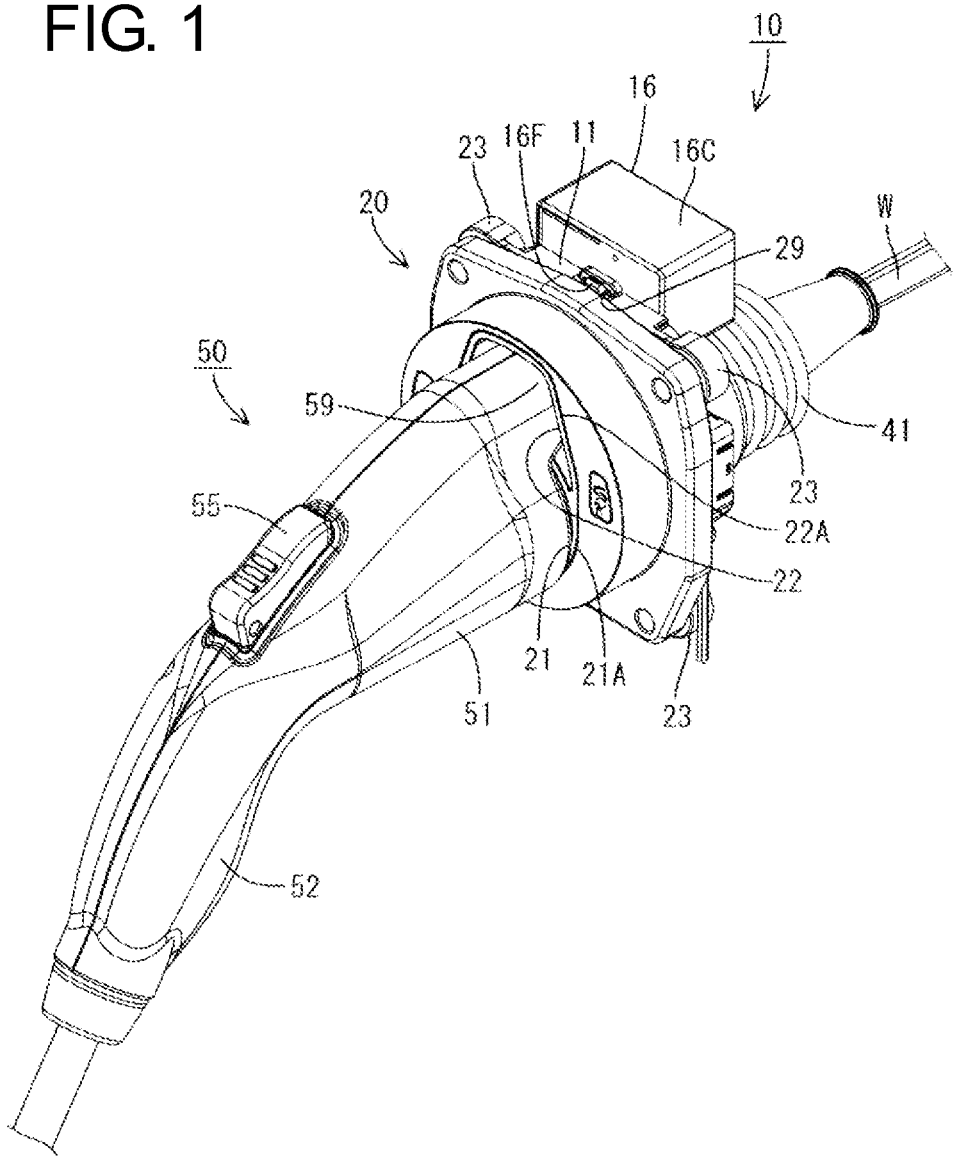
FIG. 1 is a perspective view viewed from front showing a state where a charging connector is connected to a vehicle-side connector.
Figure 2:
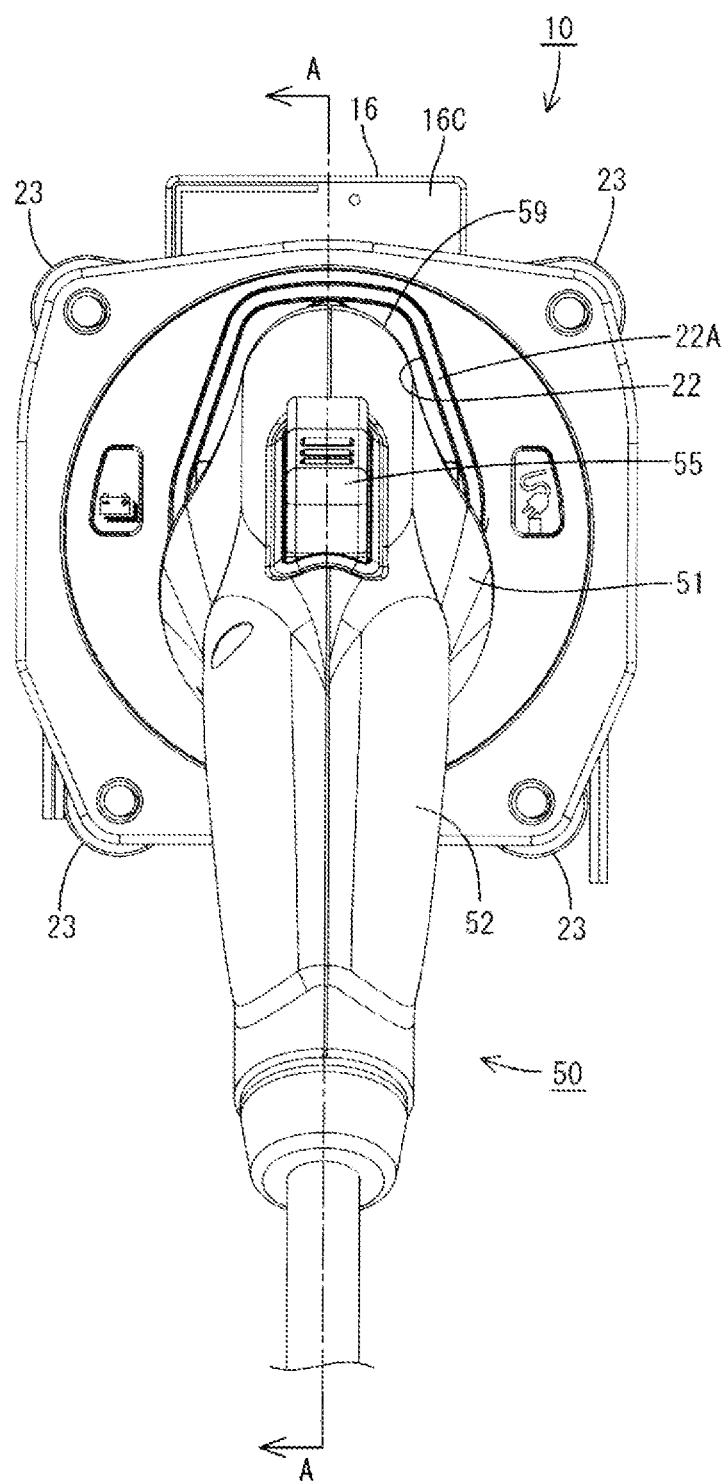
FIG. 2 is a front view showing the state where the charging connector is connected to the vehicle-side connector.

An embodiment of the present invention is described with reference to FIGS. 1 to 14. A vehicle-side connector 10 of this embodiment is connected to a battery (not shown) mounted in a vehicle via wires W, and a charging connector 50 connected to a charger is connectable thereto from front as shown in FIG. 1. The battery is charged by applying power in a state where the charging connector 50 is properly connected to the vehicle-side connector 10.

Figure 9:
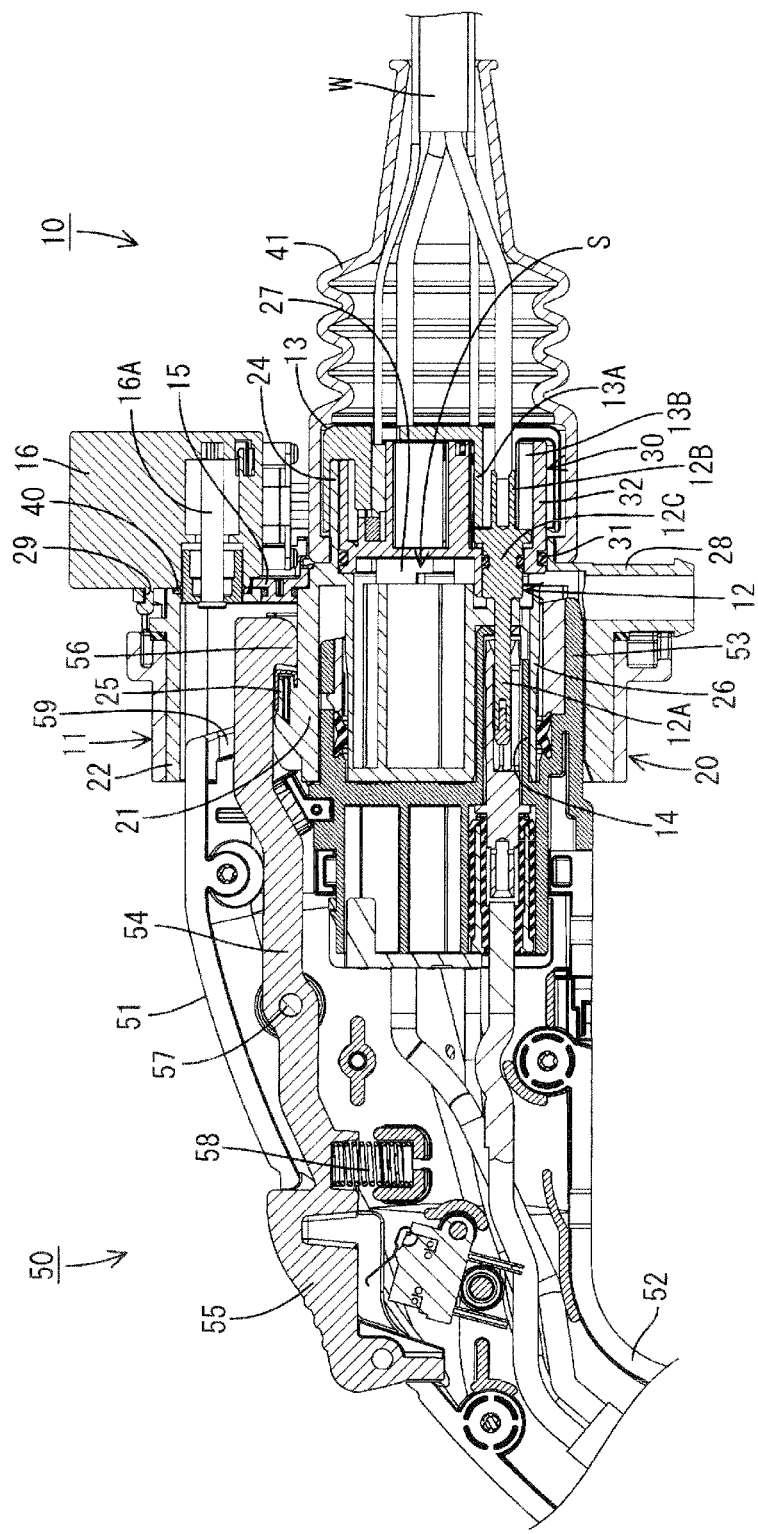
FIG. 9 is a section along A-A of FIG. 2 showing a state where a shaft portion of the actuator is at a releasing position.

The charging connector 50 in this embodiment is gun-shaped and includes, as shown in FIG. 1, a connector main body 51 constituting a substantially front half and a grip 52 extending obliquely downward from a rear end part of this connector main body 51. The connector main body 51 and the grip 52 are both made of synthetic resin and integrally molded. As shown in FIG. 9, a hollow cylindrical terminal accommodating tube 53 projecting forward is mounted on the front surface of the connector main body 51. Further, a lock arm 54 is accommodated on an upper side in the connector main body 51, and a front end part of the lock arm 54 projects forward from the front edge of the upper surface of the connector main body 51 and is facing outside.

The lock arm 54 extends in a front-back direction and an unlocking portion 55 is provided on a rear end part of the lock arm 54, whereas a locking portion 56 is provided on a front end part thereof. Further, a lever pivot portion 57 is provided substantially in a central part of the lock arm 54, and opposite front and rear end parts of the lock arm 54 are pivotable in a seesaw manner with this lever pivot portion 57 as a center.

A coil spring 58 is mounted in a compressed state below the unlocking portion 55 and pushes the rear end part of the lock arm 54 upwardly to constantly bias the lock arm 54 to a locking position shown in FIG. 9. On the other hand, when the unlocking portion 55 is pushed downwardly, the locking portion 56 is relatively pushed up and displaced to a releasing position.

The connector main body 51 is formed to bulge upwardly at a position corresponding to the lock arm 54, and a protection wall 59 is formed on a front end part of this bulging part. As shown in FIG. 1, the protection wall 59 is provided to protrude more forward than the opening edge of the connector main body 51. A front end side of the lock arm 54 is covered by the protection wall 59 while exposing only the locking portion 56.

As shown in FIG. 9, the vehicle-side connector 10 includes a housing 11 made of synthetic resin, a plurality of vehicle-side terminals 12 to be accommodated into this housing 11, a retainer 13 for holding these vehicle-side terminals 12 in the housing 11 and the like. The housing 11 includes a housing main body 20 and a sub-housing 30 to be assembled with this housing main body 20 from behind.

Figure 3:
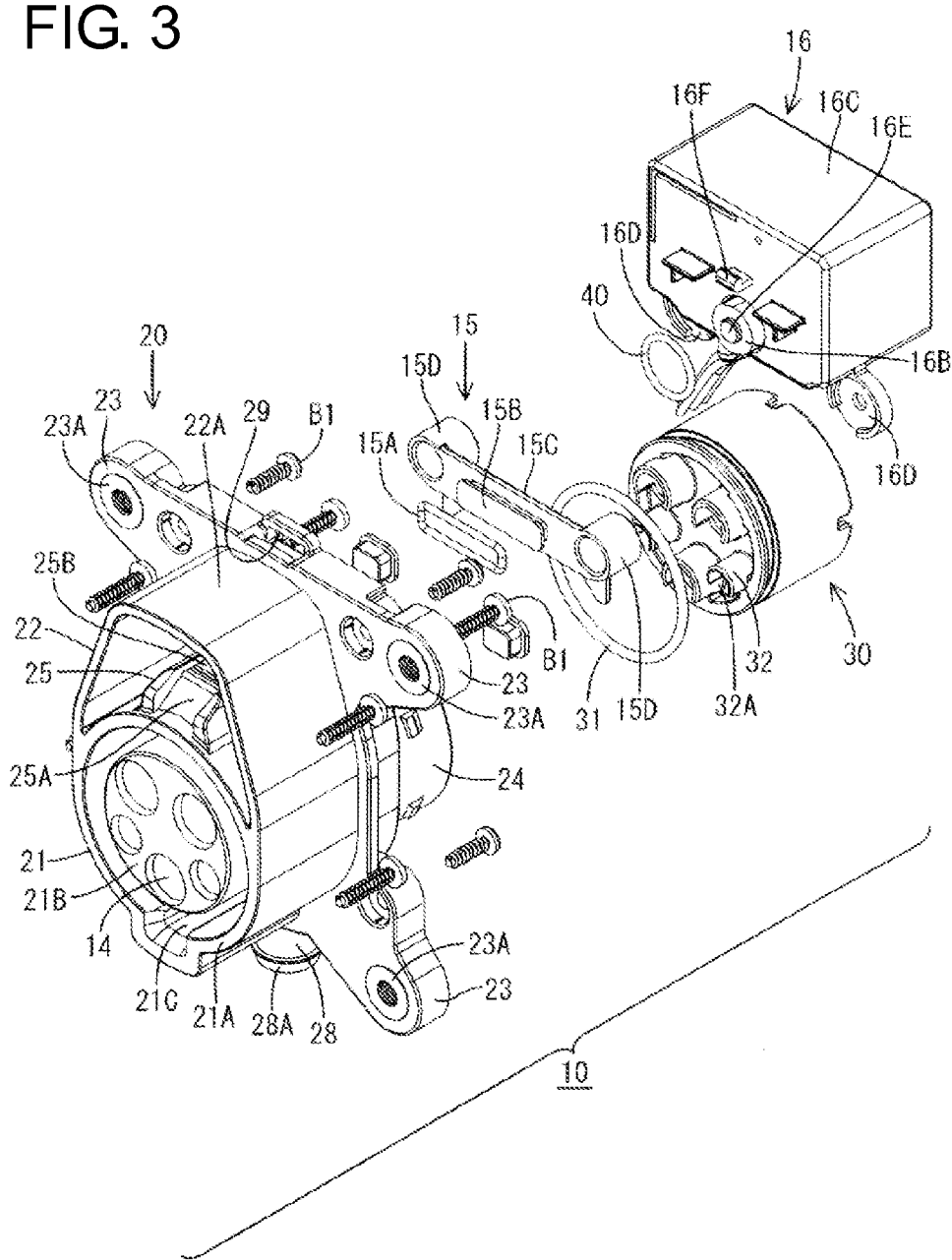
FIG. 3 is an exploded perspective view viewed obliquely from front showing constituent components of the vehicle-side connector.

As shown in FIG. 3, the housing main body 20 includes a connector fitting portion 21 into which the connector main body 51 of the charging connector 50 is to be fitted, a lock fitting portion 22 which is open forward and into which the locking portion 56 of the lock arm 54 and the protection wall 59 for protecting the locking portion 56 are fitted, a plurality of mounting portions 23 which are to be bolted to a body of a vehicle and the like. These mounting portions 23 are formed to project from four corners of the outer peripheral surface of the housing main body 20 (lower two are on the outer peripheral surface of the connector fitting portion 21, and upper two are on the outer peripheral surface of the lock fitting portion 22). A collar 23A is embedded in a projecting end part of each mounting portion 23. The housing main body 20 is fixed to the body of the vehicle by inserting bolts through these collars 23A and tightening them into the body of the vehicle.

Figure 8:
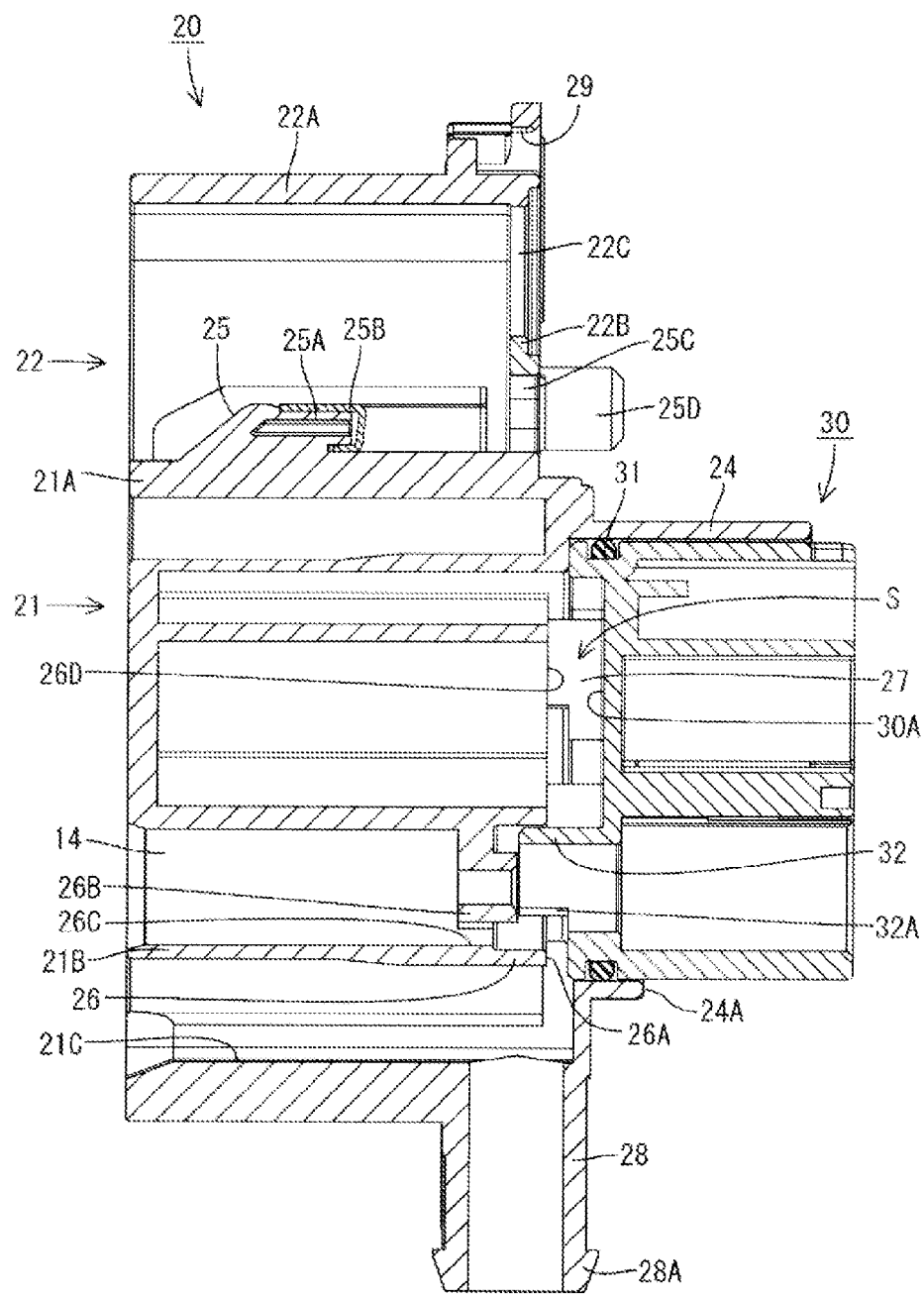
FIG. 8 is a vertical section showing an assembly of a housing main body and the sub-housing cut in a vertical direction.

A fitting tube portion 24 into which the sub-housing 30 is fittable is formed on the rear surface of the housing main body 20. This fitting tube portion 24 has a substantially hollow cylindrical shape and projects backward, and a cut 24A is formed on a lower surface side of this fitting tube portion 24 as shown in FIG. 8. When the retainer 13 is externally fitted on the outer peripheral surface of this fitting tube portion 24, the retainer 13 is held on the fitting tube portion 24 by a known lock means.

As shown in FIG. 3, the connector fitting portion 21 includes a receptacle 21A open forward and a terminal accommodating portion 21B arranged in this receptacle 21A and configured such that terminal connecting portions 12A of the vehicle-side terminals 12 are accommodated thereinto. As shown in FIG. 9, the terminal accommodating tube 53 of the charging connector 50 is fitted between the receptacle 21A and the terminal accommodating portion 21B.

A locked portion 25 to which the locking portion 56 of the charging connector 50 can be locked is formed on an upper part of the outer peripheral surface of the receptacle 21A. When the connector main body 51 of the charging connector 50 is fitted into the connector fitting portion 21 of the vehicle-side connector 10, the locking portion 56 and the locked portion 25 are locked to each other to hold the charging connector 50 and the vehicle-side connector 10 in a properly connected state. A substantially gate-shaped protection wall 22A is connected to cover the locked portion 25 on the upper surface of the outer periphery of the receptacle 21A. As shown in FIG. 8, the aforementioned lock fitting portion 22 is composed of the protection wall 22A and a back wall 22B arranged on the rear end of the protection wall 22A.

Figure 14:
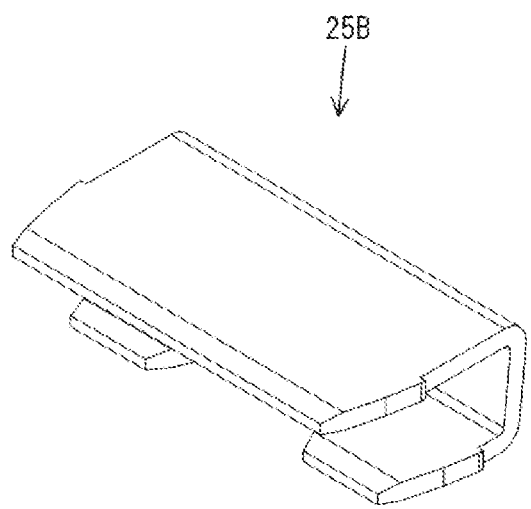
FIG. 14 is a perspective view viewed from front showing a lock plate.

The locked portion 25 includes a base portion 25A formed on the upper surface of the outer periphery of the receptacle 21A and a lock plate 25B made of metal and assembled with this base portion 25A by press-fitting. As shown in FIG. 14, this lock plate 25B is formed by folding a metal plate into a substantially U shape, and a folded part serves as a locking surface for the locking portion 56 of the lock arm 54. This locking surface protrudes in an overhanging manner as shown in FIG. 8.

Figure 6:
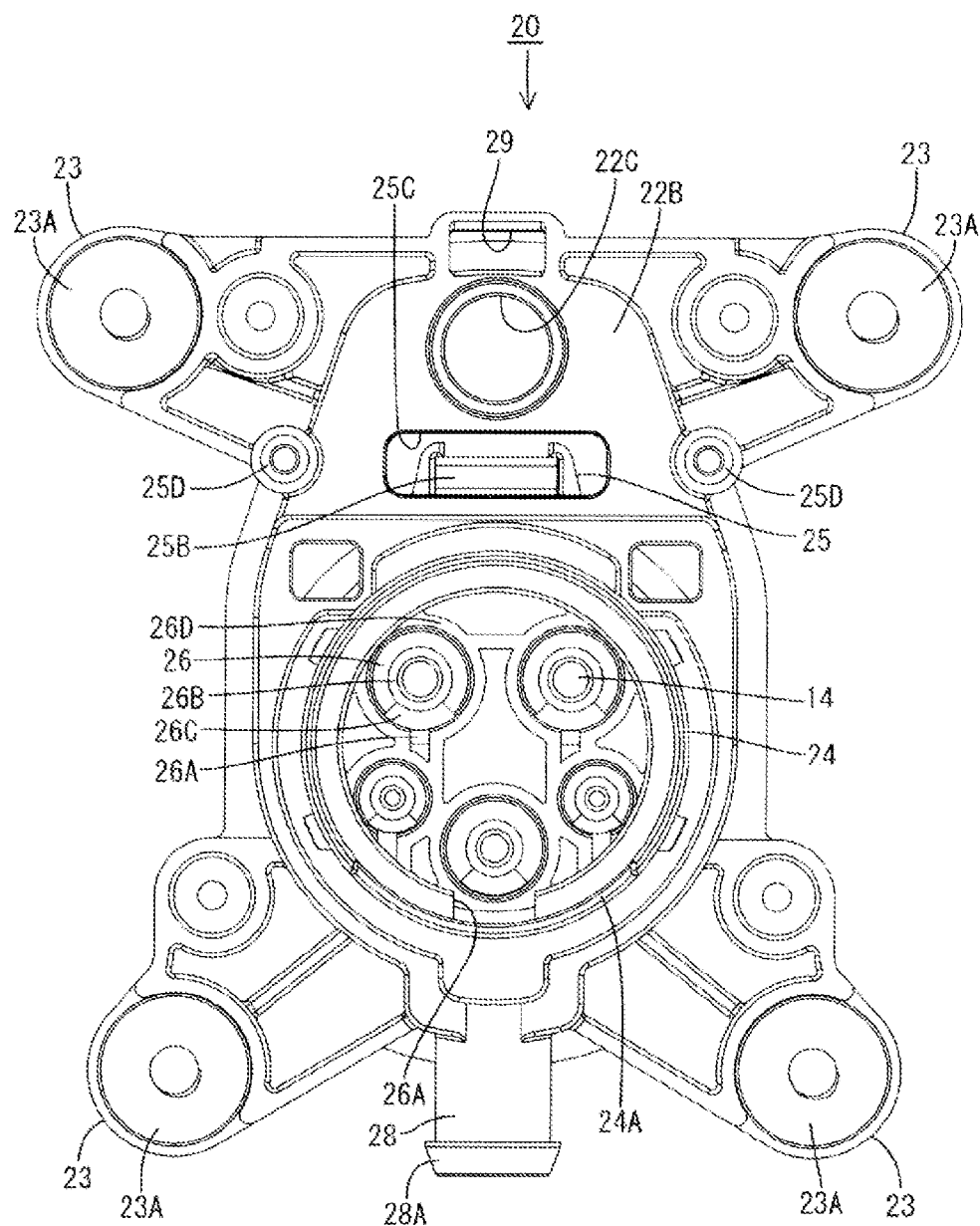
FIG. 6 is a rear view of the vehicle-side connector before a cover is mounted.

As shown in FIG. 6, the back wall 22B of the lock fitting portion 22 is formed with a mounting hole 25C for mounting the lock plate 25B onto the base portion 25A from behind. This mounting hole 25C also serves as a mold removal hole for molding the base portion 25A and is formed to penetrate through the back wall 22B in the front-back direction. By inserting a forming mold into this mounting hole 25C, a rear surface side of the base portion 25A is molded. Note that an insertion hole 22C is formed above the mounting hole 25C in the back wall 22B of the lock fitting portion 22.

Figure 5:
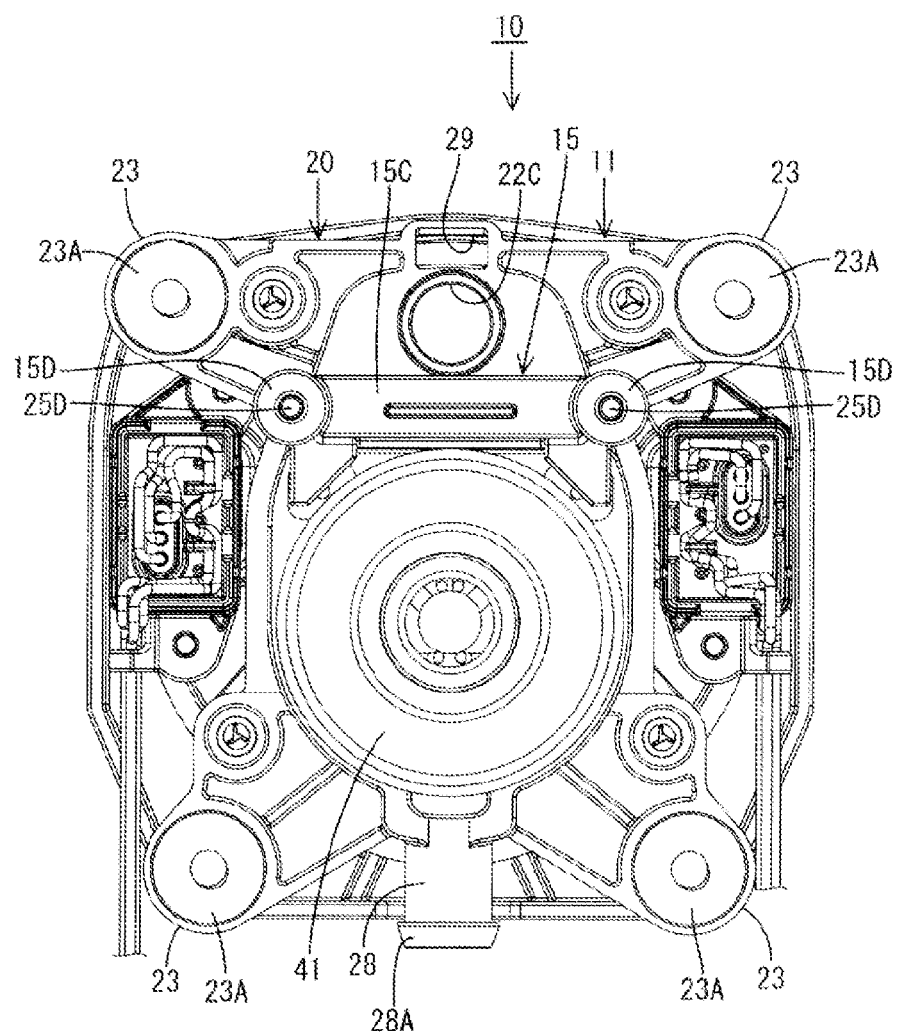
FIG. 5 is a rear view of the vehicle-side connector before an actuator is mounted.

As shown in FIG. 5, a cover 15 for closing the mounting hole 25C is mounted on the rear surface of the housing main body 20. As shown in FIG. 3, this cover 15 includes a seal mounting portion 15B on which a seal ring 15A is to be mounted, a laterally long cover main body 15C integrally formed to the seal mounting portion 15B and a pair of hollow cylindrical portions 15D formed on opposite left and right sides of this cover main body 15C.

The seal mounting portion 15B is substantially in the form of a laterally long rectangular block and the seal ring 15A is fitted on the outer peripheral surface thereof. When the cover 15 is mounted on the housing main body 20 with the seal ring 15A fitted on the seal mounting portion 15B, the seal mounting portion 15B is fitted into the mounting hole 25C and the seal ring 15A is sandwiched between the outer peripheral surface of the seal mounting portion 15B and the inner peripheral surface of the mounting hole 25. In this way, the mounting hole 25C is closed in a water cut-off state by the cover 15.

Figure 4:
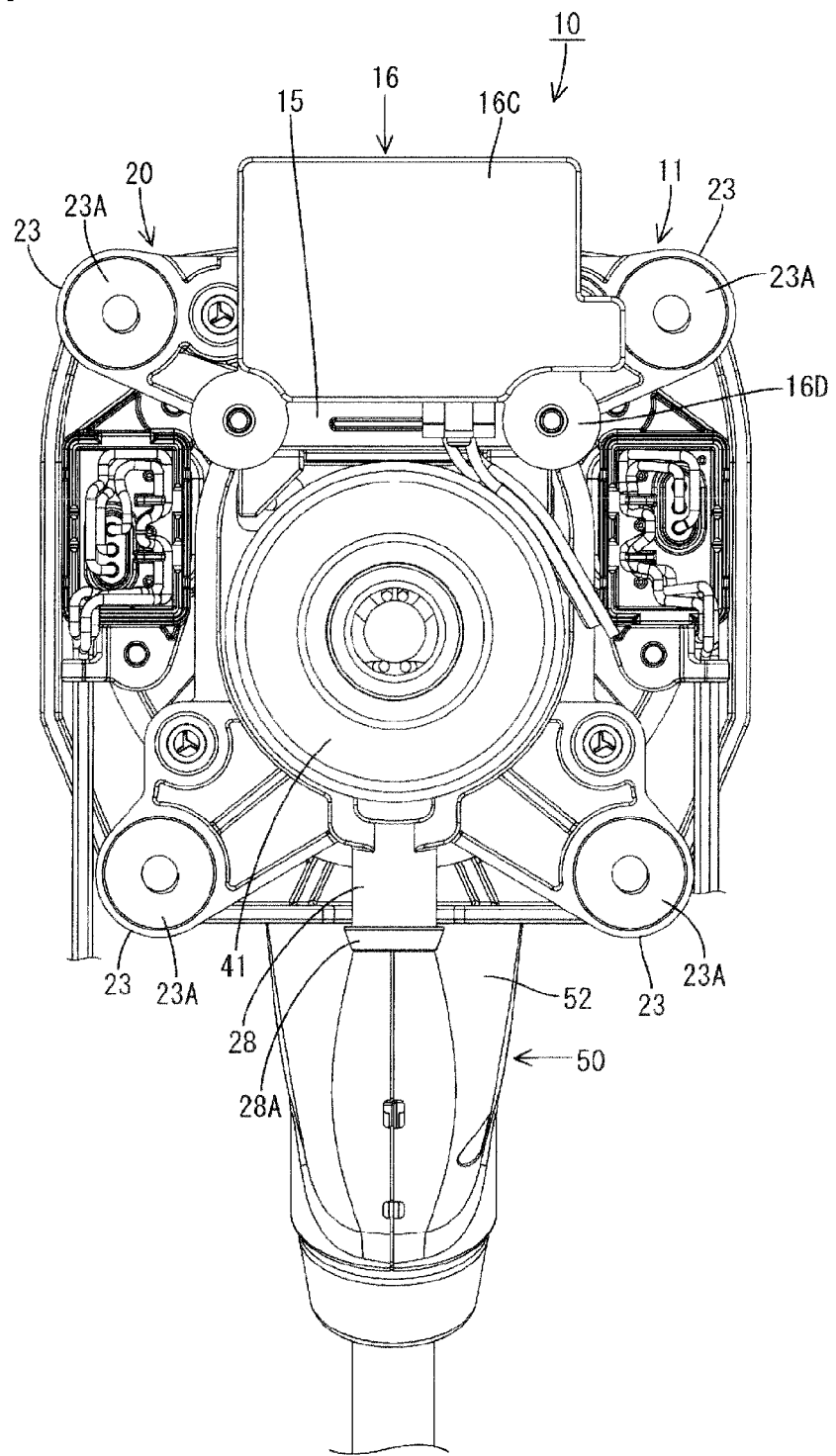
FIG. 4 is a rear view of the vehicle-side connector.

As shown in FIG. 4, an actuator 16 is mounted behind the cover 15. This actuator 16 includes a shaft portion 16A drivable in the front-back direction by a solenoid or the like, an insertion portion 16B allowing this shaft portion 16A to be inserted therethrough in the front-back direction, a case 16C for accommodating the shaft portion 16A and the insertion portion 16B inside and mounting seats 16D used to bolt the case 16C to the housing main body 20. The actuator 16 is a lock release preventing device for preventing a tip part of the lock arm 54 from pivoting in a direction to be unlocked from the lock plate 25B in a state where the tip part of the lock arm 54 is locked to the lock plate 25B.

Figure 12:
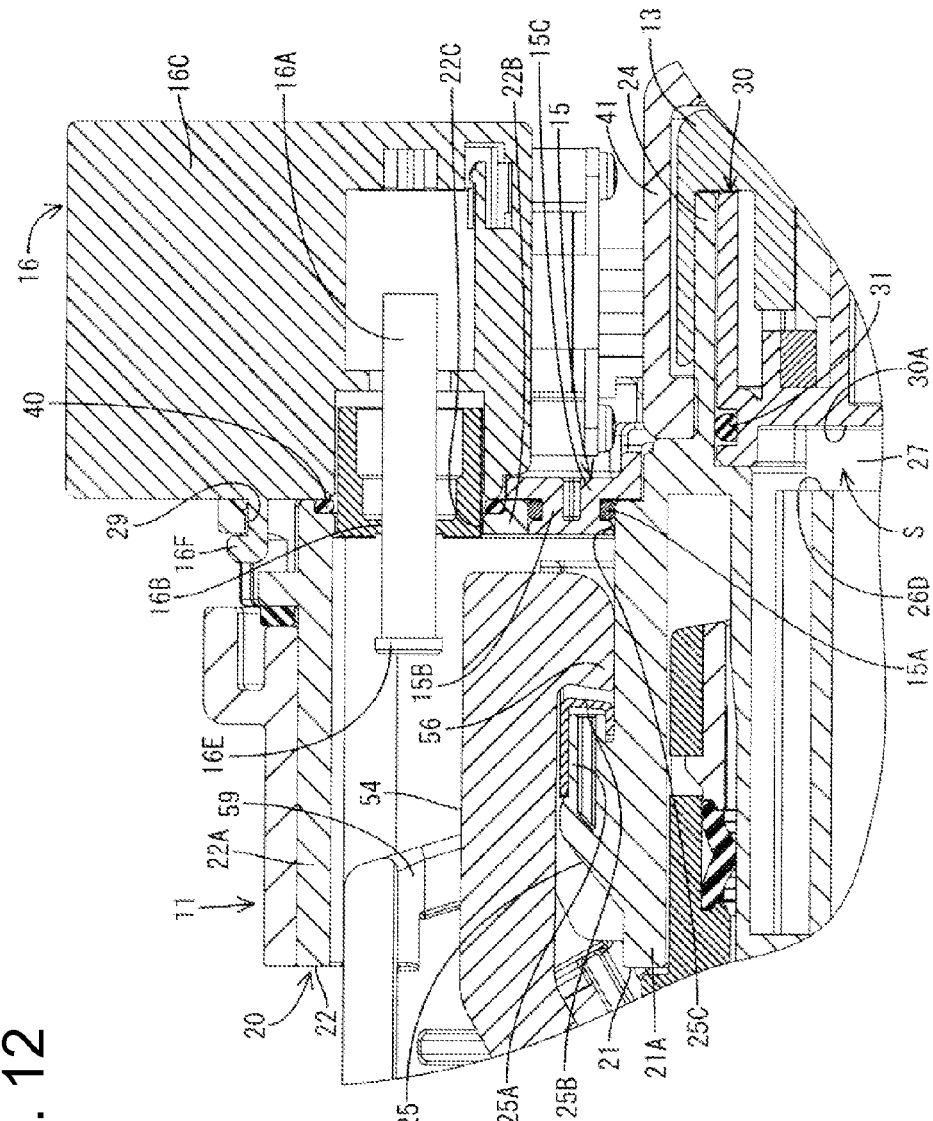
FIG. 12 is an enlarged section showing an essential part of FIG. 11.
Figure 13:
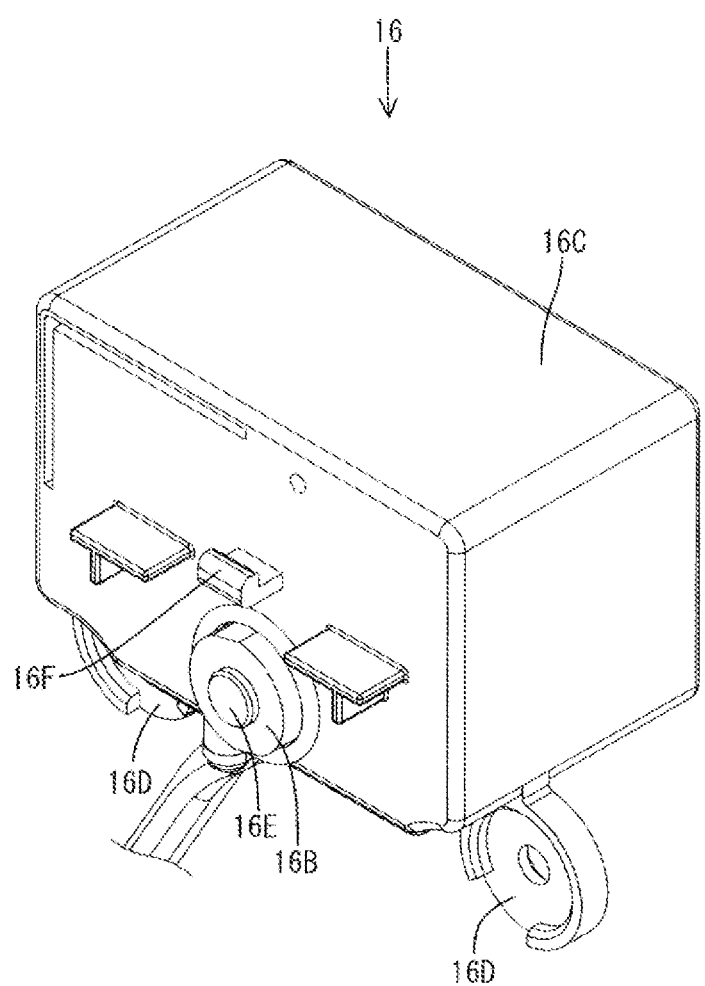
FIG. 13 is a perspective view viewed from front showing the actuator.

As shown in FIG. 6, a pair of mounting bosses 25D stand at opposite left and right sides of the mounting hole 25C on the rear surface of the housing main body 20. The mounting boss 25D is formed with a screw hole into which a mounting screw B2 is to be tightened. By externally fitting the hollow cylindrical portions 15D of the cover 15 on the mounting bosses 25D, placing the mounting seats 16D on the upper ends of the hollow cylindrical portions 15D and tightening the mounting screws B1 into the screw holes of the mounting bosses 25D, the hollow cylindrical portions 15D and the mounting seats 16D are fastened together. In this way, the cover 15 and the actuator 16 are fixed to the housing main body 20. Note that, as shown in FIG. 12, a hook portion 16F is formed to extend upward on the front surface of the case 16C of the actuator 16 and fastening by the mounting screws B1 is performed in a state where the hook portion 16F is hooked into a temporary fastening hole 29 formed on the upper surface of the housing main body 20 from below and the actuator 16 is temporarily assembled with the housing main body 20.

Figure 10:
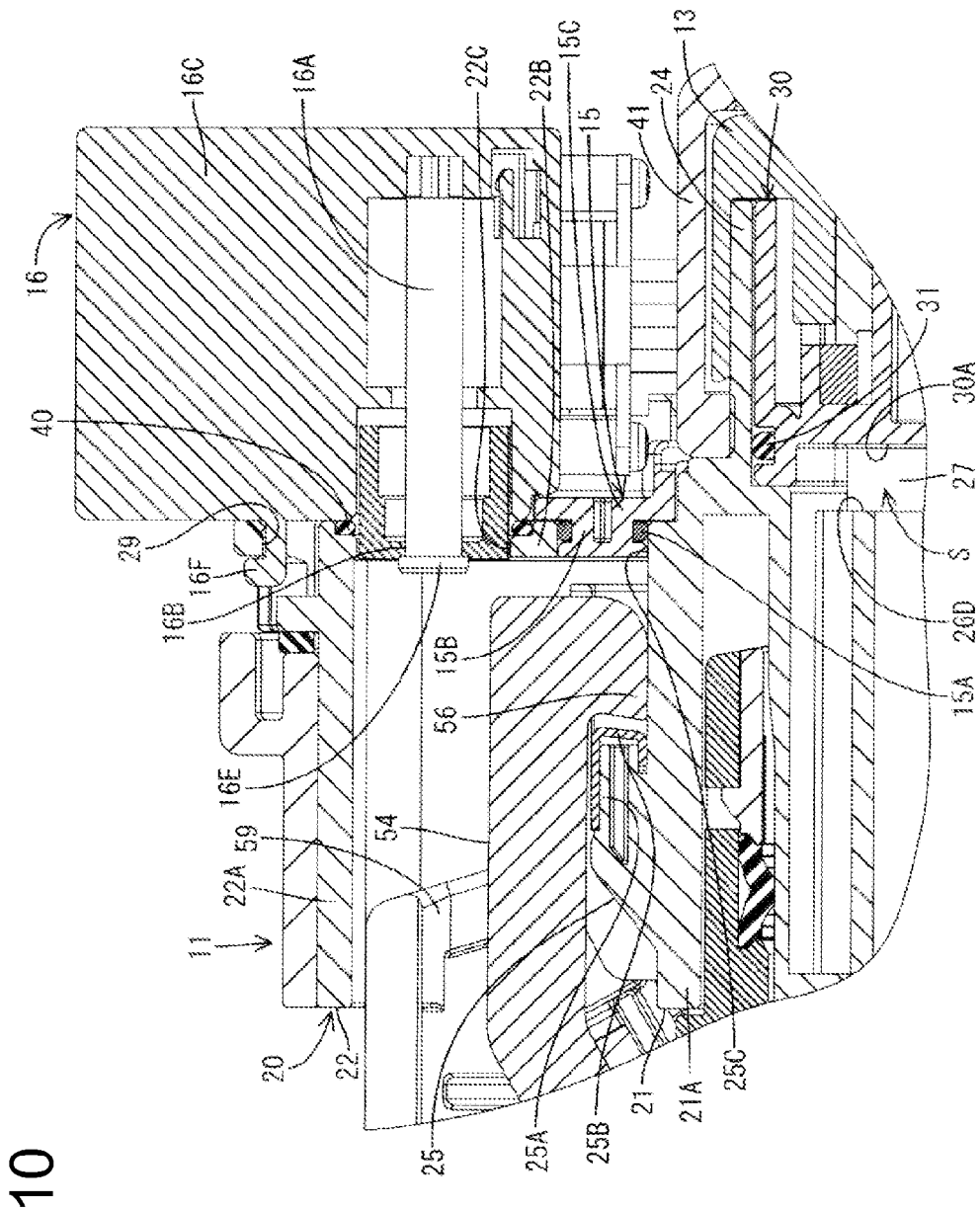
FIG. 10 is an enlarged section showing an essential part of FIG. 9.

As shown in FIG. 10, the shaft portion 16A is arranged in the insertion hole 22C with the actuator 16 fixed to the housing main body 20. Further, an O-ring 40 is sandwiched between an opening edge part on the rear end of the insertion hole 22C and the case 16C of the actuator 16. Thus, the intrusion of water into the interior of the vehicle through a clearance between the insertion hole 22C and the case 16C of the actuator 16 can be voided.

A water cut-off portion 16E having an outer diameter larger than an inner diameter of the insertion portion 16B is formed on a front end part of the shaft portion 16A. The shaft portion 16A is enabled to reciprocate in the front-back direction between a releasing position shown in FIG. 10 and a locking position shown in FIG. 12 by a driving mechanism such as a solenoid. At the releasing position, the water cut-off portion 16E is in contact with an opening edge part on the front end of the insertion portion 16B from front. Specifically, the water cut-off portion 16E is designed to close a clearance formed between the inner peripheral surface of the insertion portion 16B and the outer peripheral surface of the shaft portion 16A from front at the releasing position. Thus, at the releasing position, the intrusion of water into the case 16C can be reliably avoided.

Figure 11:
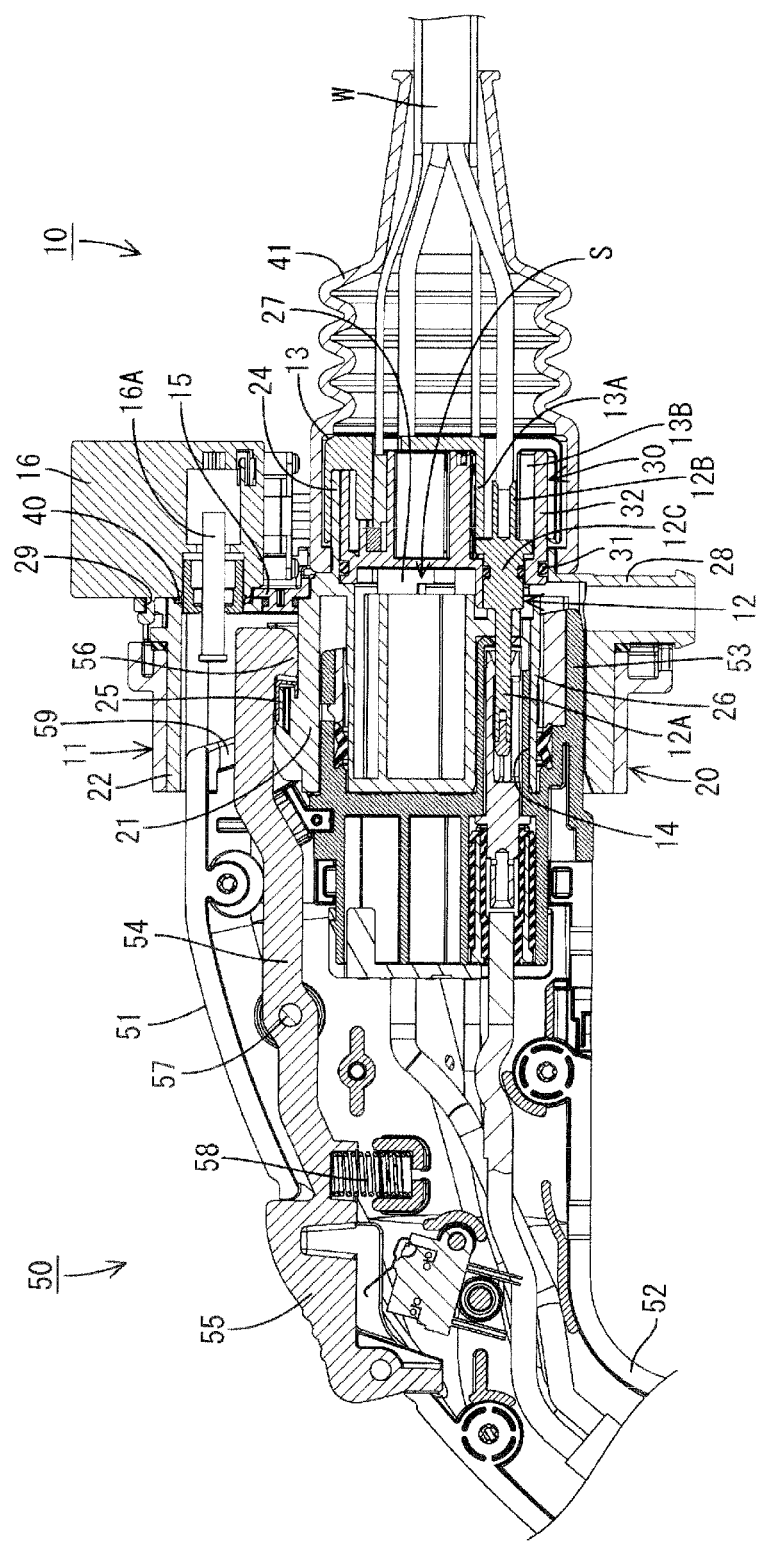
FIG. 11 is a section showing a state where the shaft portion of the actuator is moved to a locking position from the state of FIG. 9.

At the locking position, the shaft portion 16A is located above the tip part of the lock arm 54 as shown in FIG. 11. Here, a distance between the tip part of the lock arm 54 and the shaft portion 16A is set to be shorter than an engagement margin of the locking portion 56 of the lock arm 54 and the locking surface of the lock plate 25B. Thus, even if the tip part of the lock arm 54 is pivoted upwardly by pressing the unlocking portion 55, the tip part of the lock arm 54 comes into contact with the shaft portion 16A, whereby a pivotal movement of the lock arm 54 is stopped and the locking portion 56 of the lock arm 54 and the lock plate 25B are kept engaged. On the other hand, since the tip part of the lock arm 54 can freely pivot upwardly without coming into contact with the shaft portion 16A at the releasing position as shown in FIG. 9, the locking portion 56 of the lock arm 54 and the lock plate 25B can be unlocked.

The sub-housing 30 is formed into a substantially cylindrical shape and, as shown in FIG. 3, a circular ring-shaped seal member 31 is fitted on a front end part of the outer peripheral surface of the sub-housing 30. When the sub-housing 30 is fitted into the fitting tube portion 24 of the housing main body 20 as shown in FIG. 8, the sub-housing 30 and the fitting tube portion 24 are fitted in an area of the fitting tube portion 24 before the cut 24A (area where the cut 24A is not present and the peripheral wall of the fitting tube portion 24 is present over the entire circumference). In this state, the seal member 31 is sandwiched between the outer peripheral surface of the sub-housing 30 and the inner peripheral surface of the fitting tube portion 24 to cut off water between the housing main body 20 and the sub-housing 30. In other words, since the cut 24A is arranged in a water cut-off area by the seal member 31 in the fitting tube portion 24, there is no possibility of impairing water cut-off performance by the seal member 31.

Cavities 14 for accommodating the vehicle-side terminals 12 are formed in the housing 11. These cavities 14 extend straight in the front-back direction from the housing main body 20 to the sub-housing 30 and are formed to penetrate through the housing 11 in the front-back direction as shown in FIG. 6.

As shown in FIG. 9, the vehicle-side terminal 12 includes the terminal connecting portion 12A in the form of a round pin and a wire connecting portion 12B to be crimped to a core of a wire W is formed behind this terminal connecting portion 12A. A cylindrical terminal main body portion 12C having a larger diameter than the terminal connecting portion 12A is formed between the terminal connecting portion 12A and the wire connecting portion 12B. On the other hand, the retainer 13 is formed with terminal retaining portions 13A for locking the rear surfaces of the terminal main body portions 12C from behind. Thus, when the vehicle-side terminals 12 are inserted into the cavities 14 and the retainer 13 is mounted into the fitting tube portion 24, the terminal main body portions 12C of the vehicle-side terminals 12 are locked from behind by the terminal retaining portions 13A, whereby the vehicle-side terminals 12 are retained and held in the cavities 14.

An O-ring is fitted on the outer peripheral surface of the terminal main body portion 12C of the vehicle-side terminal 12 and the intrusion of water into the interior of the vehicle through the cavity 14 is prevented by sandwiching this O-ring between the outer peripheral surface of the terminal main body portion 12C and the inner peripheral surface of the cavity 1.

Figure 7:
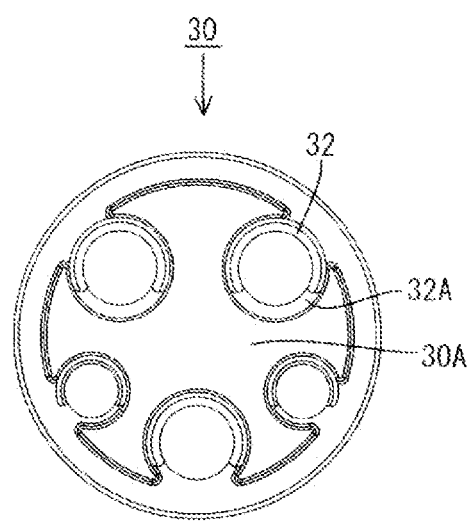
FIG. 7 is a front view of a sub-housing.

As shown in FIG. 7, substantially hollow cylindrical rear terminal accommodating tube portions 32 stand on a front surface 30A of the sub-housing 30, and water drainage holes 32A are formed on lower sides of these rear terminal accommodating tube portions 32. This water drainage hole 32A is formed in an area before the O-ring fitted on the terminal main body portion 12C (in a water cut-off area).

On the other hand, as shown in FIG. 6, substantially hollow cylindrical front terminal accommodating tube portions 26 stand on the back surface of the fitting tube portion 24 of the housing main body 20 and water guide grooves 26A are formed on lower sides of these front terminal accommodating tube portions 26. Further, substantially hollow cylindrical terminal inserting portions 26B through which the terminal connecting portions 12A of the vehicle-side terminals 12 are inserted stand on the front walls of the front terminal accommodating tube portions 26, and fan-shaped water guide holes 26C are formed on lower sides of these terminal inserting portions 26B. This water guide hole 26C is formed to penetrate through the front wall of the front terminal accommodating tube portion 26 in the front-back direction.

As shown in FIG. 8, a clearance S is formed between the rear end of the fitting tube portion 14 and the front end of the sub-housing 30 with the sub-housing 30 fitted in the fitting tube portion 24 of the housing main body 20. A water guide portion 27 is formed by an inner wall constituting this clearance S. Specifically, the water guide portion 27 is formed by defining the clearance S between rear end edges 26D of the front terminal accommodating tube portions 26 and the front surface 30A of the sub-housing 30. Further, the water guide portion 27 is arranged outside the water cut-off area by the seal member 31 and formed across the cavities 14.

A pipe-like water drainage portion 28 is formed to project downward on a lower end part of the housing main body 20. This water drainage portion 28 is arranged on the rear end of the housing main body 20 and located below the water guide portion 27. In other words, the water drainage portion 28 is formed to extend downward from an opening formed on the bottom wall of the water guide portion 27 and water having intruded into the water guide portion 27 is drained to the outside of the vehicle. A holding portion 28A is formed on a lower end part of the water drainage portion 28 by somewhat enlarging a diameter. Further, since the outer peripheral surface of the holding portion 28A is tapered, a drain hose (not shown) is easily connected to the water guide portion 27. Further, since the drain hose is expanded in diameter on the holding portion 28A, the drain hose is difficult to detach from the water drainage portion 28.

Further, a receiving groove 21C is formed in a lower end part of the connector fitting portion 21 of the housing main body 20. As shown in FIG. 3, this receiving groove 21C is formed by causing a lower end part of the receptacle 21A to bulge downward. Water having intruded into between the inner peripheral surface of the receptacle 21A and the outer peripheral surface of the terminal accommodating portion 21B flows downward to be pooled in the receiving groove 21C. Further, as shown in FIG. 8, the water drainage portion 28 is connected to the lower surface of a rear end part of the receiving groove 21C. Further, the water drainage portion 28 is also connected to the lower surface of the water guide portion 27. In other words, the water drainage portion 28 is formed by making the lower surface of the water guide portion 27 and the rear end part of the receiving groove 21C open downward.

The clearance S of the water guide portion 27 communicates with the water guide grooves 26A, inner spaces of the terminal inserting portions 26B, the water guide holes 26C, the receiving groove 21 and the water drainage portion 28. Further, when the sub-housing 30 is fitted into the fitting tube portion 24, the rear terminal accommodating tube portion 32 is fitted into the front terminal accommodating tube portion 26 to form one cavity 14. At this time, the water guide grooves 26A of the front terminal accommodating tube portions 26 and the water drainage holes 32A of the rear terminal accommodating tube portions 32 are arranged in an overlapping manner to communicate with each other in the water guide portion 27. Thus, water having intruded into the terminal accommodating portion 21 B intrudes into the front terminal accommodating tube portions 26 through the water guide holes 26C and is drained to the outside of the vehicle from the water drainage portion 28 after passing through the water drainage holes 32A of the rear terminal accommodating tube portions 32, the water guide grooves 26A and the like. Further, water having intruded into between the receptacle 21A and the terminal accommodating portion 21 B is pooled in the receiving groove 21C and drained to the outside of the vehicle from the water drainage portion 28.

This embodiment is configured as described and functions thereof are described next. First, how to assemble the vehicle-side connector 10 is described. Prior to assembling, the lock plate 25B is mounted on the base portion 25A. The lock plate 25B is press-fitted to the base portion 25A through the mounting hole 25C from behind the housing main body 20. After the press-fitting of the lock plate 25B is completed, the actuator 16 is assembled from behind with the seal mounting portion 15B of the cover 15 fitted in the mounting hole 25C from behind the housing main body 20. The mounting screws B1 are tightened to place the mounting seats 16D of the actuator 16 on the hollow cylindrical portions 15D of the cover 15. In this way, the cover 15 and the actuator 16 are fastened together to be fixed to the housing main body 20 and the mounting hole 25C is closed by the cover 15.

Subsequently, the five vehicle-side terminals 12 connected to the ends of the wires W are mounted into the retainer 13. The wire W drawn out from each vehicle-side terminal 12 is radially inserted into a corresponding vertical groove of the retainer 13. When the wire W is inserted to a back end, the wire connecting portion 12B and the end of the wire W are arranged along the terminal retaining portion 13A of the retainer 13. Subsequently, when each wire W is pulled backward, the terminal main body portion 12C of each vehicle-side terminal 12 is locked to the terminal retaining portion 13A and each vehicle-side terminal 12 is mounted while being prevented from coming out backward.

After the five vehicle-side terminals 12 are temporarily assembled while being prevented from coming out backward by the retainer 13 in this way, the retainer 13 is mounted onto the rear surface of the sub-housing 30. When the terminal connecting portion 12A of each vehicle-side terminal 12 is inserted into the cavity 14 of the sub-housing 30 from behind and the retainer 13 is subsequently pushed onto the rear surface of the sub-housing 30, the O-rings fitted on the terminal main body portions 12C of the vehicle-side terminals 12 are tightly fitted into the rear terminal accommodating tube portions 32 and the sub-housing 30 and the retainer 13 are integrally sub-assembled on the ends of the wires W (vehicle-side terminals 12) by resulting frictional forces.

In other words, a sub-assembly obtained by assembling the sub-housing 30 and the retainer 13 in advance is formed on an end of a group of the wires W and the terminal connecting portions 12A of the five vehicle-side terminals 12 are aligned and project forward from the front surface 30A of the sub-housing 30. The sub-assembly formed on the end of the group of the wires W as described above is transported to a site, where the vehicle-side connector 10 is mounted on the body of the vehicle, separately from the housing main body 20.

In mounting the vehicle-side connector 10, the housing main body 20 is fixed to the body in advance. Specifically, the housing main body 20 is arranged and located in a power supply port open on the body and the mounting portions 23 provided on the housing main body 20 are placed on mounted portions (not shown) provided on an opening edge part of the power supply port and fixed by bolting.

In this state, the sub-housing 30 is fitted into the fitting tube portion 24 from behind while the terminal connecting portion 12A of each vehicle-side terminal 12 is inserted into the front terminal accommodating tube portion 26 of the housing main body 20 from behind. The sub-housing 30 causes the terminal connecting portion 12A of each vehicle-side terminal 12 to be inserted into the terminal inserting portion 26B of the corresponding front terminal accommodating tube portion 26. Further, by mounting the peripheral wall of the retainer 13 along the outer peripheral surface of the fitting tube portion 24, the sub-housing 30 is locked in a state fitted in the fitting tube portion 24. In this way, the sub-housing 30 is integrally assembled with the housing main body 20, thereby forming the housing 11 and the single cavities 14 penetrating through the housing 11 in the front-back direction.

Associated with this, the terminal connecting portion 12A of the vehicle-side terminal 12 connected to the end of each wire W is inserted to a proper position into the corresponding cavity 14 and accommodated while being prevented from coming out backward by the terminal retaining portion 13A of the retainer 13. The group of the wires W drawn out from the vehicle-side terminals 12 is drawn out backward and connected to the battery and the like mounted in the vehicle. Note that a grommet 41 is mounted from the fitting tube portion 24 of the housing 11 to a part where the group of the wires W is drawn out, thereby cutting off water. On the other hand, a front cover (not shown) is mounted on the front surface of the housing 11, whereby the mounting of the vehicle-side connector 10 is completed.

In the case of performing a charging operation, the unillustrated front cover of the housing main body 20 is removed and the terminal accommodating tube 53 of the charging connector 50 shown in FIG. 1 is fitted into the connector fitting portion 21 after a lid body provided on the power supply port is opened. Concurrently, the locking portion 56 of the lock arm 54 of the charging connector 50 and the protection wall 59 covering the locking portion 56 are fitted into the lock fitting portion 22 of the vehicle-side terminal 10, whereby the locking portion 56 is locked to the locked portion 25 from behind. When proper connection of the two connectors 10, 50 are detected, the shaft portion 16A of the actuator 16 projects from the releasing position shown in FIG. 10 to the locking position shown in FIG. 12. In this way, the locking portion 56 and the locked portion 25 are doubly locked, thereby being able to prevent the separation of the two connectors 10, 50 during charging. Thereafter, the battery mounted in the vehicle is charged from a commercial power source.

At the time of washing the vehicle, high-pressure water may be used. In this case, even if the high-pressure water directly hits the lock fitting portion 22, most of the water is blocked by the protection wall 22A constituting the lock fitting portion 22 and becomes nearly water droplets when reaching the back wall 22B. At this time, since the water cut-off portion 16E in the form of a jaw and having a one-size larger diameter is provided on the tip of the shaft portion 16A of the actuator 16, a possibility of water intrusion into the case 16C of the actuator 16 is eliminated by this water cut-off portion 16E. Further, since the O-ring is sandwiched between the opening edge part of the insertion hole 22C and the case 16C, water does not intrude into the interior of the vehicle through the insertion hole 22C. Further, since the seal ring 15A is sandwiched between the inner peripheral surface of the mounting hole 25C and the seal mounting portion 15B of the cover 15, water does not intrude into the interior of the vehicle through the mounting hole 25C, either.

On the other hand, if high-pressure water directly hits the connector fitting portion 21, two water intrusion paths are conceivable, i.e. a path of water intrusion between the receptacle 21A and the terminal accommodating portion 21B and a path of water intrusion into the cavity 14 of the terminal accommodating portion 21B. Further, water having intruded into between the receptacle 21A and the terminal accommodating portion 21B is pooled in the receiving groove 21C after running along the inner wall of the receptacle 21A. Thereafter, this water is drained to the outside of the vehicle through the water drainage portion 28 from the rear end part of the receiving groove 21C. Subsequently, water having intruded into the cavity 14 of the terminal accommodating portion 21B is introduced to the water guide portion 27 from the cavity 14 through the water guide hole 26C and the water guide groove 26A, introduced to the water drainage portion 28 along the inner surface of the water guide portion 27 after falling down by gravity in the clearance S of the water guide portion 27, and is drained to the outside of the vehicle through the water drainage portion 28. That is, since the water having intruded into the cavity 14 freely falls down in the water guide portion 27 on the way to the sub-housing 30 from the housing main body 20, it does not intrude into the interior of the vehicle.

As described above, in this embodiment, the locked portion 25 is covered by the lock fitting portion 22 and direct hit of high-pressure water on the locked portion 25 can be avoided by providing the lock fitting portion 22. Further, since the lock plate 25B is mounted through the mounting hole 25C from behind, it is not necessary to mount the lock plate 25B from above and the lock fitting portion 22 does not stand as a hindrance in mounting the lock plate 25B. Further, since the cover 15 for closing the mounting hole 25C is provided, water intrusion into the interior of the vehicle through the mounting hole 25C can be avoided. Further, in molding the base portion 25A on which the lock plate 25B is to be mounted, a forming mold is inserted through the mounting hole 25C and removed in the front-back direction, whereby the base portion 25A can be molded.

A lock release preventing device (actuator 16) for preventing the tip part of the lock arm 54 from pivoting in a direction to be unlocked from the lock plate 25B in a state where the tip part of the lock arm 54 is locked to the lock plate 25B may be provided. According to such a configuration, the tip part of the lock arm 54 and the lock plate 25B can be doubly locked by the lock release preventing device.

The lock release preventing device (actuator 16) may include the shaft portion 16A configured to move between the locking position for preventing the lock arm 54 from pivoting by being locked to the tip part of the lock arm 54 and the releasing position for allowing the lock arm 54 to pivot by being separated from the tip part of the lock arm 54, the insertion portion 16B allowing this shaft portion 16A to be inserted therethrough, and the water cut-off portion 16E provided on the front end part of the shaft portion 16A and having the outer diameter larger than the inner diameter of the insertion portion 16B. Generally, a clearance for allowing a smooth movement of the shaft portion 16A is formed between the outer peripheral surface of the shaft portion 16A and the inner peripheral surface of the insertion portion 16B. According to the above configuration, since the above clearance can be covered from front by the water cut-off portion 16E, water intrusion into the above clearance can be prevented at the time of car washing.

The water cut-off portion 16E may close the clearance formed between the inner peripheral surface of the insertion portion 16B and the outer peripheral surface of the shaft portion 16A at the releasing position from front. According to such a configuration, water intrusion can be more reliably prevented since the above clearance is closed by the water cut-off portion 16E.

The lock release preventing device may be the actuator 16 configured to drive the shaft portion 16A in the front-back direction. According to such a configuration, the shaft portion 16A can be driven by the actuator 16.

A seal ring to be sandwiched between the opening edge part of the mounting hole 25C and the case 16C of the lock release preventing device (actuator 16) may be provided. According to such a configuration, water intrusion into the interior of the vehicle through the mounting hole can be prevented by the O-ring 40.

The present invention is not limited to the above described and illustrated embodiment. For example, the following embodiments are also included in the technical scope of the present invention.

Although the vehicle-side connector 10 including the actuator 16 is illustrated in the above embodiment, the present invention may be applied to a vehicle-side connector not including the actuator 16. In this case, a cover for collectively closing the mounting hole 25C and the insertion hole 22C may be provided or the insertion hole 22C may not be formed.

Although the shaft portion 16A is illustrated to move in the front-back direction in the above embodiment, it may vertically move according to the present invention.

Although the water cut-off portion 16E is in the form of a jaw in the above embodiment, a spherical water cut-off portion may be adopted according to the present invention. The shape does not matter as long as the water cut-off portion has a diameter larger than the inner diameter of the insertion portion 16B and can close the interior of the cover 16C.

Although the interior of the case 16C is closed at the releasing position in the above embodiment, it is sufficient to be able to close the interior of the case 16C by the water cut-off portion and there is no limitation to a case where the water cut-off portion is located at the releasing position according to the present invention. Further, the interior of the case 16C may not be completely closed by the water cut-off portion and a clearance may be formed between the water cut-off portion and the insertion portion according to the present invention on the premise that water intrusion can be prevented.

Although the shaft portion 16A is driven by the actuator 16 in the above embodiment, it may be driven, for example, by an air cylinder or a linear motor according to the present invention.

LIST OF REFERENCE SIGNS

10 . . . vehicle-side connector
15 . . . cover
16 . . . actuator (lock release preventing device)
16A . . . shaft portion
16B . . . insertion portion
16C . . . case
16E . . . water cut-off portion
22 . . . lock fitting portion
22B . . . back wall
25 . . . locked portion
25A . . . base portion
25B . . . lock plate
25C . . . mounting hole
40 . . . O-ring (seal ring)
50 . . . charging connector
54 . . . lock arm

The invention claimed is:

1. A vehicle-side connector configured such that a charging connector connected to a charger is connectable thereto from front and to be connected to a battery mounted in a vehicle, comprising:
   a receptacle for receiving terminals;
   a forwardly open lock fitting portion disposed outward of the receptacle and configured such that a tip part of a lock arm provided in the charging connector is fitted therein from the front;
   a base portion projecting out from the receptacle and inward of the lock fitting portion, the base portion having a rearward facing surface;
   a back wall rearward of the base portion and opposed to the rearward facing surface of the base portion, a mounting hole formed through the back wall at a position opposed to the rearward facing surface of the base portion;
   a locked portion provided in the lock fitting portion and formed by mounting a lock plate made of metal through the mounting hole and to the rearward facing surface of the base portion, the locked portion being configured such that the tip part of the lock arm is to be locked thereto; and
   a cover mounted to the back wall from a rear side opposite the lock fitting portion to close the mounting hole.

2. A vehicle-side connector configured such that a charging connector connected to a charger is connectable thereto from front and to be connected to a battery mounted in a vehicle, comprising:
   a lock fitting portion open forward and configured such that a tip part of a lock arm provided in the charging connector is fitted therein from the front;
   a locked portion provided in the lock fitting portion and formed by mounting a lock plate made of metal and configured such that the tip part of the lock arm is to be locked thereto on a base portion; and
   a lock release preventing device configured to prevent the tip part of the lock arm from pivoting in a direction to be unlocked from the lock plate in a state where the tip part of the lock arm is locked to the lock plate, wherein a mounting hole for mounting the lock plate from behind is formed on a back wall of the lock fitting portion and a cover is provided to close the mounting hole.

3. The vehicle-side connector of claim 2, wherein the lock release preventing device includes:
    a shaft portion configured to move between a locking position for preventing the lock arm from pivoting by being locked to the tip part of the lock plate and a releasing position for allowing the lock arm to pivot by being separated from the tip part of the lock arm;
    an insertion portion allowing the shaft portion to be inserted therethrough; and
    a water cut-off portion provided on a front end part of the shaft portion and having an outer diameter larger than an inner diameter of the insertion portion.

4. The vehicle-side connector of claim 3, wherein the water cut-off portion closes a clearance formed between an inner peripheral surface of the insertion portion and an outer peripheral surface of the shaft portion at the releasing position from front.

5. The vehicle-side connector of claim 4, wherein the lock release preventing device is an actuator configured to drive the shaft portion in a front-back direction.

6. The vehicle-side connector of claim 5, comprising a seal ring to be sandwiched between an opening edge part of the mounting hole and a case of the lock release preventing device.

7. The vehicle-side connector of claim 3, wherein the lock release preventing device is an actuator configured to drive the shaft portion in a front-back direction.

8. The vehicle-side connector of claim 2, comprising a seal ring to be sandwiched between an opening edge part of the mounting hole and a case of the lock release preventing device.

* * * * *